(No Model.)
M. CULBERTSON & J. J. BURKE.
PLOW ATTACHMENT.
No. 528,324. Patented Oct. 30, 1894.
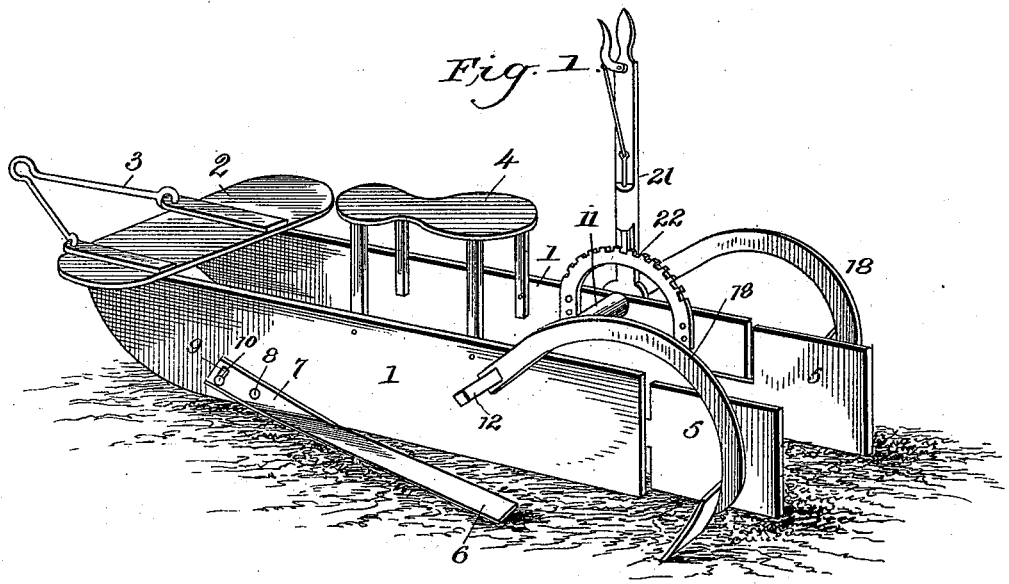
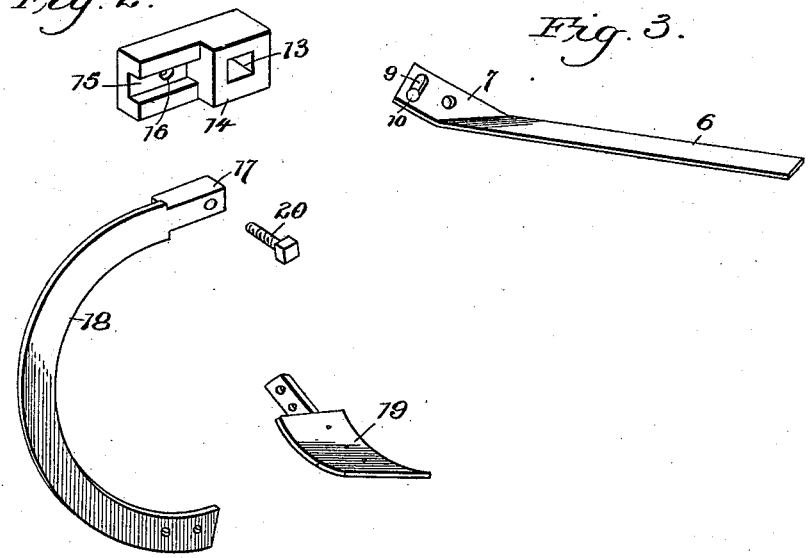
Witnesses
J. W. Reynolds
Chas. S. Hoyer
Inventors
Mathew Culbertson
Joseph J. Burke.
By John Wedderburn
Attorney

UNITED STATES PATENT OFFICE.

MATHEW CULBERTSON AND JOSEPH J. BURKE, OF WILBER, NEBRASKA;
SAID CULBERTSON ASSIGNOR TO SAID BURKE.

PLOW ATTACHMENT.

SPECIFICATION forming part of Letters Patent No. 528,324, dated October 30, 1894.
Application filed June 9, 1894. Serial No. 514,115. (No model.)

*To all whom it may concern:*

Be it known that we, MATHEW CULBERTSON and JOSEPH J. BURKE, citizens of the United States, residing at Wilber, in the county of Salina and State of Nebraska, have invented certain new and useful Improvements in Plow Attachments; and we do hereby declare the following to be a full, clear, and exact description of the invention, such as will enable others skilled in the art to which it appertains to make and use the same.

This invention relates to plows and pertains particularly to a shovel attachment therefor, the object of the invention being to provide a simple and effective device for plowing corn.

With these and other objects in view the invention consists of the construction and arrangement of the several parts, which will be more fully hereinafter described and claimed.

In the drawings, Figure 1 is a perspective view of a plow embodying the invention. Fig. 2 is a detailed perspective view of a shovel plow beam, the casting and set screw used in connection therewith, and the shovel plow disconnected. Fig. 3 is a similar view of one of the side shovels or scrapers.

Similar numerals of reference are employed to indicate corresponding parts of the several views.

Referring to the drawings, the numeral 1 designates a pair of oppositely situated runners which are preferably constructed of wood and connected by an upper front cross beam or strip 2, to which the draft attachment 3 is applied. In the rear of the said cross strip or beam 2 is a seat 4 and attached to the rear ends of the runners 1 are shields 5 which are arranged parallel and may be removed from the rear ends of the runners, if desired. To the lower front portion of the runners on the outer sides of the same are blades or scrapers 6 which are arranged at an obtuse angle and extend outwardly and rearwardly and have an attaching shank 7 through which is passed a pivot or bolt 8, and the front end of each of said shanks is provided with a slot 9 to permit the blades or scrapers to be adjusted above the level of the ground to a desired degree and held in their adjustment by a securing bolt 10.

On the rear upper portion of the runners 1 is mounted a rotatable shaft 11 whose outer ends are shouldered and made square as at 12, and through which are fitted the enlarged square apertured ends 13 of casting 14, having outer slots 15 with a bolt opening 16 therein, one casting being fitted on each end of the shaft. In the slots or grooves 15 of the casting are removably mounted the reduced ends 17 of grooved plow beams 18, to which are also removably attached shovel plows 19.

The castings 14 are held on the ends of the shaft 11 by set screws 20, and to support the said shaft a lever 21 is attached thereto which coacts with a toothed segment 22 to hold the said plow beams and the shafts carried thereby at any desired degree of adjustment. By means of the slot or groove 15 in each of the castings, it only requires a single bolt to hold the beams in secure connection with said castings.

It will be understood that the shovels throw up the dirt and that the blades or scrapers also assist in this operation as well as to raise any plants which may be lying low or which have become beaten down, and the advantages and purport of the device will be readily understood by those skilled in the art.

Having thus described the invention, what is claimed as new is—

In a device of the character set forth, the combination of oppositely situated runners having adjustably situated scrapers or blades on the outer sides thereof, shields connected with the rear of the runners, a shaft mounted on the upper rear portion of the said runners and adapted to be rotated, and beams adjustably mounted on the ends of said shaft and carrying shovels on their lower ends, substantially as and for the purposes specified.

In testimony whereof we have signed this specification in the presence of the subscribing witnesses.

MATHEW CULBERTSON.
JOSEPH J. BURKE.

Witnesses for Mathew Culbertson:
LESLIE STUART,
JOHN R. WALL.

Witnesses for Joseph J. Burke:
J. N. VAN DUYN,
W. H. DAVIS.